United States Patent [19]

Itaka et al.

[11] Patent Number: 4,496,789
[45] Date of Patent: Jan. 29, 1985

[54] INSULATING SPACER AND METAL SHEATH FOR GAS INSULATED ELECTRICAL EQUIPMENT

[75] Inventors: Koshi Itaka; Takushi Hara, both of Osaka, Japan

[73] Assignee: Sumitomo Electric Industries, Ltd., Osaka, Japan

[21] Appl. No.: 446,108

[22] Filed: Dec. 2, 1982

[30] Foreign Application Priority Data

Dec. 2, 1981 [JP] Japan .............................. 56-179969

[51] Int. Cl.³ .......................... H02G 5/06; H01B 9/04
[52] U.S. Cl. ...................................... 174/22 C; 174/28
[58] Field of Search ...................... 174/21 C, 22 C, 28

[56] References Cited

U.S. PATENT DOCUMENTS 4,316,051 2/1982 Krieter et al. .................... 174/28 X

FOREIGN PATENT DOCUMENTS 2526671 12/1976 Fed. Rep. of Germany .... 174/22 C

Primary Examiner—Laramie E. Askin
Attorney, Agent, or Firm—Sughrue, Mion, Zinn, Macpeak and Seas

[57] ABSTRACT

A disk, or circular-cone-shaped insulating spacer for gas insulated equipment wherein a portion of the insulating spacer, which is secured to a metal sheath, is greater in thickness than the other portion of the spacer. The insulating spacer is brought into contact with the metal sheath through portions of the metal sheath which are outward of arcuate portions of flanges formed on said metal sheath. The distance between opposed flange surfaces which are formed in said metal sheath may be larger in the outside portion of the metal sheath than that in the inside portion of the metal sheath. The insulating spacer is brought into contact with the metal sheath through the outside portion of the metal sheath.

3 Claims, 7 Drawing Figures

INSULATING SPACER AND METAL SHEATH FOR GAS INSULATED ELECTRICAL EQUIPMENT

BACKGROUND OF THE INVENTION

This invention relates to an improvement in an insulating spacer for gas insulated equipment.

Heretofore, a disk-shaped or circular-cone-shaped insulating spacer for gas insulated equipment has been secured to a metal sheath according to a method in which the periphery of the spacer is held by a flange formed on the metal sheath. FIG. 1 is a longitudinal sectional view illustrating a method of securing a conventional disk-shaped insulating spacer to a metal sheath. In FIG. 1, reference numeral 1 designates the disk-shaped insulating spacer; element 2, the sheath to which the spacer 1 is secured; and element 3, a conductor. The internal space defined by the conductor 3 and the metal sheath 2 is filled with $SF_6$ gas 4 having excellent insulation characteristics.

FIG. 2 is a longitudinal sectional view illustrating a method of securing a conventional circular-cone-shaped insulating spacer to a metal sheath. In FIGS. 1 and 2, like components are designated by like reference numerals. More specifically, in FIG. 2, reference numeral 1 designates the circular-cone-shaped insulating spacer; the metal sheath having a flange surrounding the spacer to which the spacer is secured to is element 2; and numeral 3 designates a conductor. The space between the conductor 3 and the metal sheath 2 is filled with $SF_6$ gas 4. FIG. 3 is an enlarged view showing the mounting part of the insulating spacer 1, through which the insulating spacer 1 is secured to the metal sheath 2, in the case of FIG. 1 or 2. In FIG. 3, those components which have been previously described with reference to FIGS. 1 and 2 are therefore similarly numbered. When the flange-shaped part of the metal sheath 2 holds the periphery of the spacer 1, the spacer 1 is brought into contact with the metal sheath through opposed end portions having arcs R1 which are formed by opposed bends of the flange-shaped portion. The distribution of electric field strength at the flange-shaped portion is shown in FIG. 4. As shown in FIG. 4, the electric field strength is not uniform at the flange-shaped portion, and the electric field strength (hereinafter referred to as "stress", when applicable) is a maximum at the opposed end portions R1 of the arcs. Accordingly, when the insulating spacer 1 is brought into contact with the sheath 2 at the opposed end portions of the arcs, the stress is significantly increased. As a result, the contact region where the spacer 1 and the sheath 2 are in contact with each other becomes electrically weak. Hence, the flashover voltage of the spacer is greatly decreased, and the insulating characteristic is degraded.

SUMMARY OF THE INVENTION

In view of the deficiencies in the prior art, an object of this invention is to provide an insulating spacer which can be secured to a metal sheath without lowering the insulation characteristic of the insulating spacer.

The invention is directed to a disk or cone-shaped insulating spacer for gas insulated equipment wherein the portion of the insulating spacer secured to a metal sheath is of greater thickness than the remainder of the spacer. The spacer is brought into engagement with the metal sheath flanges while not contacting the outwardly bent arcuate end portions of flanges formed on said sheath. At the point where the spacer passes between these bent portions a gap exists between the spacer and the sheath due to the configuration of the spacer.

DESCRIPTION OF THE PREFERRED EMBODIMENTS

Figure 1:
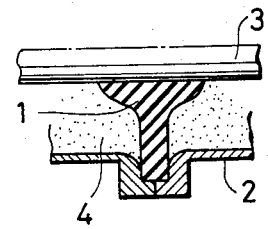
FIG. 1 is a longitudinal sectional view illustrating conventional structure for securing a disk-shaped insulating spacer to a metal sheath for gas insulated equipment.
Figure 2:
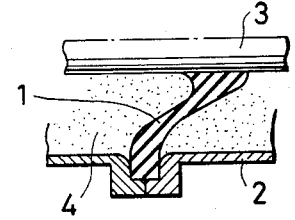
FIG. 2 is a longitudinal sectional view illustrating a conventional structure for securing a circular-cone-shaped insulating spacer to a metal sheath for gas insulated equipment.
Figure 3:
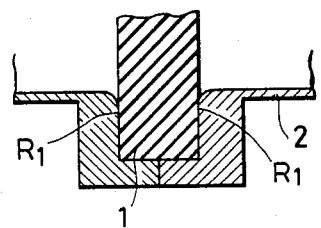
FIG. 3 is an enlarged view showing in detail the structure for securing the insulating spacer to the metal sheath in FIG. 1 or FIG. 2.
Figure 4:
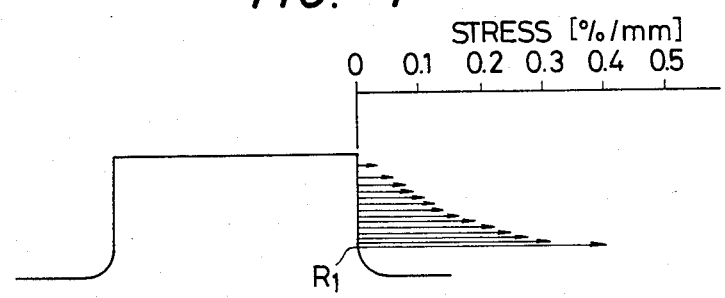
FIG. 4 is a diagram showing an electric field distribution at a conventional insulating spacer mounting portion of the metal sheath.
Figure 5:
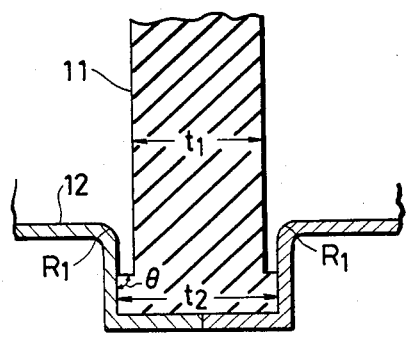
FIG. 5 is a longitudinal sectional view showing one embodiment of a structure for securing an insulating spacer to a metal sheath according to this invention.

This invention will be described with reference to its preferred embodiments shown in FIGS. 5, 6 and 7. FIG. 5 is a longitudinal sectional view illustrating the mounting portion of an insulating spacer which is secured to a metal sheath. In FIG. 5, reference numeral 11 designates the periphery of the insulating spacer and numeral 12 a flange-shaped surrounding and holding portion of the metal sheath to which the spacer's periphery 11 is fixedly secured. The insulating spacer's periphery 11, which is held by the flange-shaped surrounding and holding portion 12 comprises a first part, having a thickness $t_1$ and a second part having a thickness $t_2$ which extends from the first part thus forming an outer lip on the spacer. The second part having a thickness $t_2$ of the spacer contacts and is held by the flange-shaped part of the metal sheath. That is, the periphery of the spacer is brought into contact with the metal sheath only at portions thereof which are outward of the arcuate end corners R1 of the flange-shaped surrounding and holding portion 12. In this case, it is desirable that the angle 0 between the second part having a thickness $t_2$ of the spacer and the metal sheath flange surface is substantially 90°. There is no contact at the bending portions of the sheath flange.

Figure 6:
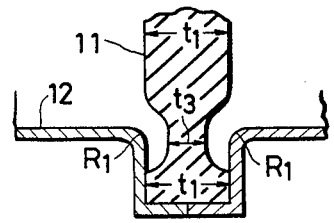
FIG. 6 and FIG. 7 are longitudinal sectional views of second and third embodiments of the structure according to the invention.

A second embodiment of the invention is shown in FIG. 6. In this embodiment, the thickness of the insulating spacer's periphery 11 is partially reduced from $t_1$ to $t_3$ where the periphery 11 confronts the arcuate end portions which are formed at the opposed bends of the flange-shaped surrounding and holding part 12. Thus, the outermost part having a thickness $t_1$ of the spacer contacts and is held by the flange-shaped surrounding and holding portion 12 by contact with the metal sheath flange surface through the portions of the flange-shaped surrounding and holding portion 12 which are outwardly of the arcuate end portion.

Figure 7:
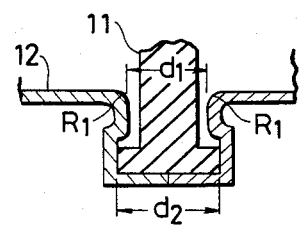

In a third embodiment of the invention, as shown in FIG. 7, opposed flange surfaces are formed in the metal sheath in such a manner that they are spaced by a distance $d_1$ from each other at the inside portion of the metal sheath and by $d_2$ from each other at the outside portion. As shown, $d_1$ is smaller than $d_2$. Thus, the insulating spacer's periphery is surrounded and held by the flange-shaped surrounding and holding portion through the outer portions of the opposed flange surfaces.

As is apparent from the above description, when the insulating spacer is embraced by the opposed flanges which are formed on the metal sheath, it is not brought into contact with the arcuate end portions R1 at the bends of the flange-shaped surrounding and holding portion. It is at this point where the stress is at a maximum value. That is, the insulating spacer engages the metal sheath through the particular region where the stress is originally low. Accordingly, the increase of the electric field stress at the insulating spacer is low, the contact region between the metal sheath and the insulating spacer can withstand the electric field stress, and the flashover voltage of the insulating spacer is not decreased. Consequently, the insulation characteristic of the insulating spacer is not significantly lowered. According to experiments conducted by the inventors, it has been confirmed that, with the prior art structure, flashover occurs from the contact region between the spacer and the metal sheath, while with the structure according to the invention, no flashover occurs from the insulating spacer mounting even under conditions of a voltage increased by 25% of the flashover voltage of the conventional structure.

Accordingly, with this invention, degradation of the insulating characteristic of the insulating spacer is effectively prevented.

What is claimed is:

1. An insulating spacer and metal sheath assembly for gas insulated equipment comprising:
an insulating spacer having a portion of increased thickness relative to another portion thereof, a metal sheath having outwardly extending opposed flange surfaces which include confronting arcuate portions located adjacent the inner surface of the sheath, said spacer portion of increased thickness contacting and being held by said flange surfaces while not contacting said arcuate portions, the distance between said opposed flange surfaces being larger at an axially outside portion of said metal sheath than at an axially inside portion of said metal sheath; and said insulating spacer portion of increased thickness being brought into contact with said metal sheath on the outside portion of said metal sheath.

2. The apparatus of claim 1 wherein said insulating spacer is disk-shaped.

3. The apparatus of claim 1 wherein said insulating spacer is cone-shaped.

* * * * *